(12) United States Patent
Alger

(10) Patent No.: US 6,612,603 B2
(45) Date of Patent: Sep. 2, 2003

(54) TRAILER HITCH ALIGNMENT SYSTEM

(76) Inventor: Michael D. Alger, 1625 Hwy. 304 West, Hernando, MS (US) 38632

( * ) Notice: Subject to any disclaimer, the term of this patent is extended or adjusted under 35 U.S.C. 154(b) by 18 days.

(21) Appl. No.: 09/949,318

(22) Filed: Sep. 7, 2001

(65) Prior Publication Data

US 2003/0047909 A1 Mar. 13, 2003

(51) Int. Cl.$^7$ ................................................. B60D 1/36
(52) U.S. Cl. ........................ 280/477; 359/872; 33/264
(58) Field of Search ........................ 280/477; 359/872, 359/871; 33/264

(56) References Cited

U.S. PATENT DOCUMENTS

| | | | |
|---|---|---|---|
| 270,906 A | 10/1883 | Orr | 12/162 |
| 3,765,703 A * | 10/1973 | Voelkerding et al. | 280/477 |
| 3,818,599 A * | 6/1974 | Tague | 33/264 |
| 3,964,575 A * | 6/1976 | Gostling | 182/230 |
| 4,017,977 A | 4/1977 | Light et al. | 33/1 |
| 4,163,606 A * | 8/1979 | Granno | 359/871 |
| 4,285,138 A | 8/1981 | Berry | 33/264 |
| 4,537,416 A | 8/1985 | Linaburg | 280/478 |
| 4,666,176 A * | 5/1987 | Sand | 280/477 |
| 4,723,788 A | 2/1988 | Suter | 280/477 |
| D299,490 S | 1/1989 | Berg et al. | D12/162 |
| 4,856,200 A | 8/1989 | Riggs | 33/264 |
| 4,905,376 A | 3/1990 | Neeley | 33/264 |
| 4,933,691 A * | 6/1990 | Leslie | 396/427 |
| 5,035,441 A | 7/1991 | Murray | 280/477 |
| 5,111,342 A * | 5/1992 | Quesada | 359/872 |
| D327,867 S | 7/1992 | Elliott | 12/162 |
| D331,900 S | 12/1992 | Simmen | 12/162 |
| 5,180,182 A | 1/1993 | Haworth | 280/477 |
| 5,269,554 A | 12/1993 | Law et al. | 280/477 |
| 5,277,447 A | 1/1994 | Blaser | 280/479 |
| 5,309,289 A | 5/1994 | Johnson | 359/871 |
| 5,478,101 A | 12/1995 | Roberson | 280/477 |
| 5,482,310 A * | 1/1996 | Staggs | 280/477 |
| 5,558,352 A | 9/1996 | Mills | 280/477 |
| 5,680,706 A | 10/1997 | Talcott | 33/286 |
| 5,758,854 A * | 6/1998 | Shih | 248/354.3 |
| 5,970,619 A * | 10/1999 | Wells | 33/264 |
| 6,076,847 A | 6/2000 | Thornton | 280/477 |
| 6,100,795 A | 8/2000 | Otterbacher et al. | 340/431 |
| 6,213,608 B1 * | 4/2001 | Osgood | 359/841 |
| 6,264,340 B1 * | 7/2001 | Menefee | 359/881 |

* cited by examiner

Primary Examiner—Paul N. Dickson
Assistant Examiner—George D Spisich
(74) Attorney, Agent, or Firm—Wm. Bruce Day

(57) ABSTRACT

A trailer hitch alignment hitch system uses height adjustable stanchions with length adjustable arms terminating in mirrors. The stanchions are respectively connectible to a tow vehicle and a trailer and placed so that the mirror is aligned vertically over the hitch connection component of the tow vehicle and the trailer and adjusted so that the respective mirrors are at different heights. The tow vehicle operator backs the tow vehicle until the mirrors visually indicate vertical alignment by one mirror coming into place below the other mirror and obstructing the view of the hitch component.

3 Claims, 1 Drawing Sheet

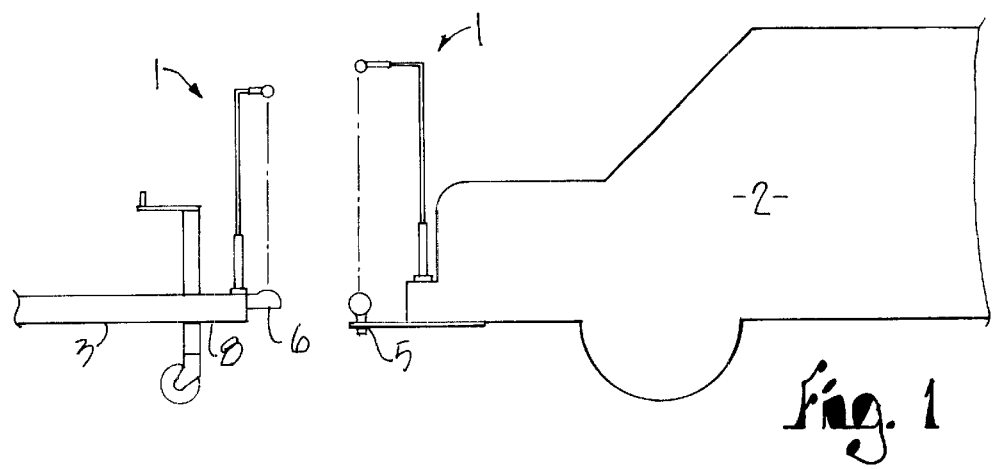
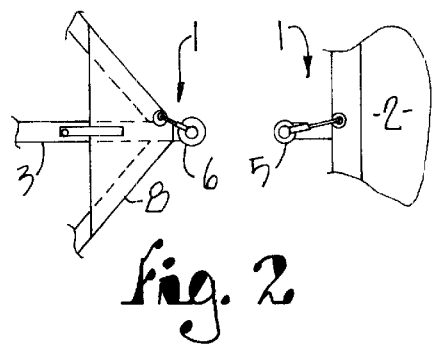
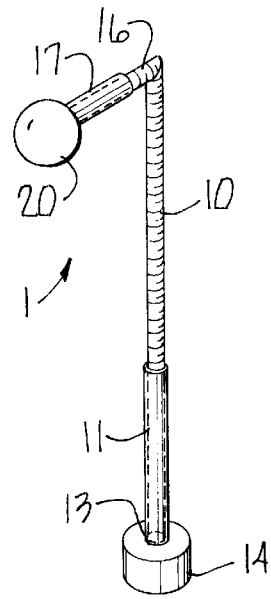
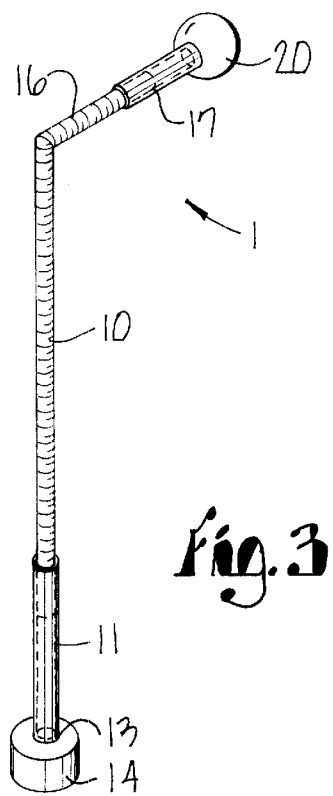

TRAILER HITCH ALIGNMENT SYSTEM

FIELD OF THE INVENTION

This invention relates to visual aids for alignment of trailer and tow vehicle hitch components so that the operator, without the aid of others, can back the tow vehicle ball under the trailer hitch socket in preparation for connection.

BACKGROUND OF THE INVENTION

Proper positioning of the tow vehicle such as a truck or car in relation to the trailer to be towed has often been a topic of much discussion and concern, because the area is normally blind to the tow vehicle driver. Typically, if the driver is alone, the driver maneuvers the vehicle back and forth numerous times, accompanied by getting out of the vehicle many times and checking on the position of the components. If a helper is used, so often the helper is not used to and does not provide precise directions or his commands are not heard or understood by the driver. The inventor has seen numerous situations where the driver and the helper engage in comical gesturing and yelling before the vehicle is finally properly positioned. This appears to be a fertile source of marital discord and frustration, particularly if one partner becomes hard of hearing.

Various reflectors and alignment devices for aligning the trailer hitch ball attached to a vehicle with a trailer hitch receptacle attached to the trailer are previously known, but none have provided the structure and advantages provided in the present invention. None offer the ease of use and the adaptability of the present device.

OBJECTS OF THE INVENTION

The objects of the present invention are:

a) to provide a trailer hitch alignment system which is easily mountable and dismountable from a vehicle and a trailer and offers precise alignment;

b) to provide a device which is adjustable in height and length for adaptability to differing configurations of cars and trailers; and c) to provide such a device which is low in cost and particularly effective for its intended use.

Other objects and advantages of the present invention will become apparent from the following description taken in connection with the drawings.

SUMMARY OF THE INVENTION

A trailer hitch alignment system for the purpose of facilitating a single person to precisely position the tow hitch of the towing vehicle under the ball receiving socket without help from others. The system includes a pair of vertically adjustable upright stanchions which are attached in longitudinal alignment with the hitch ball of the tow vehicle and the ball socket of the trailer by a readily attachable and detachable mount. The stanchions have adjustable length arms extending outwardly from the top with reflectors such as mirror balls mounted at the arm ends. The tow vehicle stanchion is mounted so that the mirror ball arms extend rearwardly. The trailer stanchion vice-versa and the mirror balls are positioned so that the driver is able to look rearward from the driver's seat and see the mirror balls in vertical alignment, one above the other. When the balls come into vertical alignment, the hitch is also located above the tow ball and the driver stops backing the vehicle, then lowers the trailer front end into engagement with the hitch.

DESCRIPTION OF THE DRAWINGS

FIG. 1 illustrates a pair of alignment devices respectively mounted on a tow vehicle and a trailer.

FIG. 2 is a top fragmentary view of the alignment devices shown in FIG. 1.

FIG. 3 is a perspective view of the alignment device such as mounted on a tow vehicle.

FIG. 4 is a perspective view of the alignment device such as mounted on a trailer.

DESCRIPTION OF THE PREFERRED AND ALTERNATE EMBODIMENTS

As required, a detailed embodiment of the present invention is disclosed herein; however, it is to be understood that the disclosed embodiment is merely exemplary of the invention which may be embodied in various forms. Therefore, specific structural and functional details disclosed herein are not to be interpreted as limiting, but merely as a basis for teaching one skilled in the art to variously employ the present invention in virtually any appropriately detailed structure.

Referring to the drawings in more detail:

FIG. 1 generally indicates an alignment device embodying the present invention. Preferably, and as shown in FIG. 1, a pair of alignment devices 1 are respectively mounted to a tow vehicle 2 and a trailer 3 adjacent their respective hitch components 5 and 6 thereof. The illustrated hitch component 5 is a typical towing ball extending from the rear of the vehicle 2. These towing balls may be part of a step bumper, such as ordinarily used on pick-up trucks or may be a frame mounted hitch as is more commonly used in passenger cars. The towing ball is sized to fit within a hitch receptacle such as the hitch component 6 extending from a front tongue 8 from the trailer 3.

Referring to FIG. 3, an exemplary alignment device 1 is formed of a vertically adjustable stanchion 10 which is adjustable in length such as by a threaded sleeve 11. The stanchion 10 and the sleeve 11 are threaded so that the parts extend or retract relative to the other as the sleeve is rotated. The bottom of the sleeve 11 forms an attachment end 13 which includes a device or mechanism for easy attachment to the tow vehicle 2 or the trailer 3. In the illustrated example, this is shown to be a magnet 14 although other devices, such as suction cups, clamps or the like may be advantageously used. Magnets 14 are preferred for ease of placement.

Extending from the upper end of the stanchion 10 is a laterally adjustable arm 16 with adjustment likewise provided by an end sleeve 17. The arm 16 and end sleeve 17 are both threaded and work the same way as the stanchion 10 and the sleeve 11. At the remote end of the sleeve 17 is attached a reflector 20. The reflector 20 may be of various types, preferably including a mirror ball as illustrated. Alternative reflectors include planar or convex mirrors or other polished surfaces providing a mirror-like or reflective surface so that a driver of the tow vehicle 2 may see the reflected image of the hitch component 5 or 6. The alignment device 1 may be also used as an emergency warning device to provide visual enhancement in case the tow vehicle 2 or trailer 3 becomes disabled. In that instance, it is preferred that the reflector 20 be some sort of prismatic reflector of either ball shape or generally planar shaped so as to provide a visual warning to oncoming vehicles.

The alignment device 1 is advantageously used for aligning tow vehicle and trailer hitch components by positioning one of the devices 1 on the tow vehicle 2 adjacent to hitch component 5 thereof so that the reflector 20, such a mirror is aligned vertically over the hitch component 5. A second alignment device is similarly mounted on a trailer 3 adjacent the hitch component thereof so that its reflector 20 mirror is aligned vertically over the trailer hitch component 6. Preferably the alignment devices are adjusted in height so that one of the stanchions is at a greater height than the other. Thereafter, the driver backs the tow vehicle by reference to the mirror ball reflectors 20 until one of the mirror balls comes into place below the other and obstructs view of the hitch component. At that point, the hitch components are aligned vertically and the driver may simply lower the trailer hitch receptacle onto the ball of the tow vehicle. Alternatively, the operator may prefer to position the alignment devices so that the respective reflectors 20 touch each other and at that point, the operator knows that the hitch components are vertically aligned. Because of the easily mountable attachment bases, the operator may then dismount the devices 1 and store them for subsequent use. If when traveling on the highway, either the tow vehicle or the trailer becomes disabled, the driver may mount the alignment devices 1 on the disabled vehicle to provide a visually enhanced warning to oncoming cars. In this use, a prismatic reflector would be preferable to a mirror ball or planar mirror for enhanced visual recognition by oncoming drivers.

While the invention has been illustrated and described in its preferred form, it will be apparent that the invention is subject to alteration and modification without departing from the underlying principals involved, and the invention is not limited to its specific details illustrated and described except in so far as set forth in the following claims.

What is claimed and desired to be protected by Letters Patent is:

1. A method for aligning tow vehicle and trailer hitch components comprising the steps of:
   a) positioning a first stanchion having an arm with a mirror on the end thereof on a trailer adjacent the hitch component thereof so that said mirror is aligned vertically over the hitch component;
   b) positioning a second stanchion likewise having an arm with a mirror on the end thereof on a tow vehicle adjacent the hitch component thereof so that said mirror is aligned vertically over the hitch component, the mirrors of the first and second stanchions being at different heights;
   c) backing the tow vehicle until said mirrors, respectively attached to the first and second stanchions, visually indicate vertical alignment by one mirror coming into place below the other mirror and obstructing view of the hitch component to a tow vehicle driver.

2. A device for aligning tow vehicle and trailer hitch components and comprising:
   a) a vertically adjustable stanchion having an attachment end connectible to a tow vehicle or a trailer adjacent a hitch component thereof;
   b) a laterally adjustable arm extending outwardly from said stanchion;
   c) a reflector mounted upon an end of said arm for positioning in vertical alignment with the hitch component there below, whereby a tow vehicle driver may view the reflected image of the hitch component while operating the vehicle from a driver's seat thereof and position the tow vehicle relative to the trailer so that the respective hitch components are aligned for connection;
   d) there being a pair of said devices with the respective reflectors thereof vertically aligned over the respective hitch components of the tow vehicle and trailer whereby the driver positions the tow vehicle until the reflectors are in mutual vertical alignment to align the respective hitch components.

3. A method for aligning tow vehicle and trailer hitch components comprising the steps of:
   a) positioning a first stanchion having an arm with a reflector on the end thereof on a trailer adjacent the hitch component thereof so that said reflector is aligned vertically over the hitch component;
   b) positioning a second stanchion likewise having an arm with a reflector on the end thereof on a tow vehicle adjacent the hitch component thereof so that said reflector is aligned vertically over the hitch component, the reflectors of the first and second stanchions being a different heights;
   c) backing the tow vehicle until said reflectors, respectively attached to the first and second stanchions, visually indicate vertical alignment by one reflector coming into place below the other reflector and obstructing view of the hitch component to a tow vehicle driver.

* * * * *